US008643547B2

(12) United States Patent
Hong et al.

(10) Patent No.: US 8,643,547 B2
(45) Date of Patent: Feb. 4, 2014

(54) ANTENNA PATTERN FRAME, METHOD AND MOLD FOR MANUFACTURING THE SAME, ELECTRONIC DEVICE CASE HAVING ANTENNA PATTERN FRAME EMBEDDED THEREIN, AND METHOD FOR MANUFACTURING THE SAME

(75) Inventors: Ha Ryong Hong, Gyunggi-Do (KR); Jae Suk Sung, Gyunggi-Do (KR); Nam Il Seo, Seoul (KR); Dae Kyu Lee, Gyunggi-Do (KR); Chan Gwang An, Gyunggi-Do (KR); Chang Mok Han, Chungcheongnam-Do (KR); Tae Sung Kim, Seoul (KR); Kyong Keun Lee, Gyunggi-Do (KR); Ki Won Chang, Gyunggi-Do (KR); Sung Eun Cho, Gyunggi-Do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 1055 days.

(21) Appl. No.: 12/646,381

(22) Filed: Dec. 23, 2009

(65) Prior Publication Data

US 2011/0032153 A1    Feb. 10, 2011

(30) Foreign Application Priority Data

Aug. 10, 2009   (KR) .......................... 10-2009-0073353

(51) Int. Cl.
*H01Q 1/38*   (2006.01)
(52) U.S. Cl.
USPC ........................ 343/700 MS; 343/702; 29/600
(58) Field of Classification Search
USPC ............................... 343/700 MS, 702; 29/600
See application file for complete search history.

(56) References Cited

U.S. PATENT DOCUMENTS

| 6,366,261 | B1 | 4/2002 | Stout et al. |
| 6,396,444 | B1 | 5/2002 | Goward et al. |
| 6,822,609 | B2 | 11/2004 | Mendolia et al. |
| 6,839,029 | B2 * | 1/2005 | Mendolia et al. ...... 343/700 MS |
| 8,368,597 | B2 * | 2/2013 | Sung et al. ............. 343/700 MS |
| 2005/0244611 | A1 | 11/2005 | Deininger et al. |
| 2007/0040755 | A1 | 2/2007 | Na et al. |
| 2008/0316120 | A1 | 12/2008 | Hirota et al. |
| 2009/0015490 | A1 | 1/2009 | Honda et al. |
| 2010/0271283 | A1 | 10/2010 | Sung et al. |
| 2011/0030198 | A1 | 2/2011 | Lee et al. |

FOREIGN PATENT DOCUMENTS

| DE | 69209549 T2 | 9/1996 |
| DE | 102006006924 A1 | 6/2007 |
| DE | 102006030913 A1 | 1/2008 |

(Continued)

OTHER PUBLICATIONS

Korean Office Action for 10-2009-0073353 dated Mar. 17, 2011.

(Continued)

*Primary Examiner* — Tan Ho
(74) *Attorney, Agent, or Firm* — McDermott Will & Emery LLP

(57) ABSTRACT

An antenna pattern frame includes an antenna radiator receiving an external signal and transmitting the received external signal to an electronic device, a radiator frame having the antenna radiator on a surface thereof, and a guide boss protruding from the radiator frame and preventing the radiator frame from moving vertically in a mold for manufacturing an electronic device case having an inner space having a shape corresponding to that of an electronic device case.

20 Claims, 7 Drawing Sheets

(56) References Cited

FOREIGN PATENT DOCUMENTS

| | | |
|---|---|---|
| DE | 102009055289 A1 | 11/2010 |
| DE | 102009055360 A1 | 4/2011 |
| EP | 0500219 B1 | 8/1992 |
| EP | 1 686 651 | 8/2006 |
| JP | 10-026933 A | 1/1988 |
| JP | 2003-036431 A | 2/2003 |
| JP | 2009-21932 | 1/2009 |
| JP | 2009004875 A | 1/2009 |
| KR | 1020070109332 A | 11/2007 |
| WO | WO2004028120 | 4/2004 |
| WO | WO2008123191 | 10/2008 |

OTHER PUBLICATIONS

Office Action corresponding to JP2009-291343 dated, dated Aug. 21, 2012.
Office Action from corresponding EP Application No. 10171175.2.
German Office Action of 102009055204.9 dated Nov. 9, 2011.
Japanese Office Action 2009-291343 issued Aug. 23, 2011.
Office Action issued in corresponding Chinese Application No. 200910265263.4 on Jan. 14, 2013, with English translation.
Notice of Office Action Japanese Patent Application No. 2011-255486 dated Nov. 26, 2013.

* cited by examiner

ANTENNA PATTERN FRAME, METHOD AND MOLD FOR MANUFACTURING THE SAME, ELECTRONIC DEVICE CASE HAVING ANTENNA PATTERN FRAME EMBEDDED THEREIN, AND METHOD FOR MANUFACTURING THE SAME

CROSS-REFERENCE TO RELATED APPLICATIONS

This application claims the priority of Korean Patent Application No. 10-2009-0073353 filed on Aug. 10, 2009, in the Korean Intellectual Property Office, the disclosure of which is incorporated herein by reference.

BACKGROUND OF THE INVENTION

1. Field of the Invention

The present invention relates to an antenna pattern frame enabling an antenna pattern to be embedded in an electronic device case, a method and mold for manufacturing the same, and an electronic device case employing the antenna pattern frame.

2. Description of the Related Art

Mobile communications terminals such as cellular phones, personal digital assistants (PDAs) and laptop computers, which support wireless communications, are indispensable devices in modern society. Functions including CDMA, wireless LANs, GSM and DMB have been added to these mobile communications terminals. One of the most important components that enable these functions to operate is associated with antennas.

Antennas being used in these mobile communications terminals have advanced from external antennas, such as rod antennas or helical antennas, to internal antennas that are disposed inside of terminals.

External antennas are susceptible to damage by external shock, while internal antennas increase the volume of terminals.

In order to solve these problems, research has been undertaken to manufacture antennas that are formed integrally with mobile communications terminals.

In order that antennas are formed integrally with terminals, a method of bonding flexible antennas to terminal bodies using adhesives is used. Recently, a method of forming antenna films by molding has been proposed.

However, when flexible antennas are bonded by simply using adhesives, the reliability of these antennas is reduced as the adhesiveness decreases. Besides, this also causes harm to the appearance of the terminals, lessening emotional quality for consumers.

In addition, when antenna films are used, product stability can be ensured. However, a process of bonding an antenna to a film is difficult to perform and manufacturing costs are also increased.

Moreover, when such antenna films undergo a molding process, the elasticity of the antenna films makes it to difficult to inject a molding solution into the mold while fixing the antenna films.

SUMMARY OF THE INVENTION

An aspect of the present invention provides an antenna pattern frame having an antenna radiator on a surface thereof such that the antenna radiator is embedded in an electronic device case, and firmly fixed even when a resin material is injected in a mold for manufacturing the electronic device case, and a method and mold for manufacturing the antenna pattern frame.

An aspect of the present invention also provides a method for manufacturing an electronic device case, capable of improving the appearance of an electronic device case by injection-molding the electronic device case in such away that an upper end of a guide boss, protruding from an antenna pattern frame in order to prevent the vertical movement of the antenna pattern frame disposed in a mold for manufacturing an electronic device case, is melted when a resin material is injected.

According to an aspect of the present invention, there is provided an antenna pattern frame including: an antenna radiator receiving an external signal and transmitting the received external signal to an electronic device; a radiator frame having the antenna radiator on a surface thereof; and a guide boss protruding from the radiator frame and preventing the radiator frame from moving vertically in a mold for manufacturing an electronic device case having an inner space having a shape corresponding to that of an electronic device case.

The guide boss may make contact with the mold for manufacturing an electronic device case, or form a fine gap with the mold for manufacturing an electronic device case.

The antenna radiator may include: an antenna pattern portion controlling a reception bandwidth of an external signal; and a connection terminal portion transmitting the received external signal to an electronic device, wherein the antenna pattern portion and the connection terminal portion are arranged in different planes of the radiator frame.

The antenna radiator may be bent to provide the connection terminal portion, the antenna pattern portion, and the connection portion connected therebetween.

The radiator frame may have a curved portion with a curvature, and the antenna radiator may be flexible so that the antenna radiator is disposed on the curved portion.

The antenna radiator may have a top at the same level as that of the radiator frame.

The guide boss may protrude from the radiator frame while having a decreasing sectional area.

The guide boss may have a body portion and a tip portion having a smaller area than the body portion.

The guide boss may be formed of the same material as a resin material forming the electronic device case.

The guide boss may be formed of a material having a lower melting point than a resin material forming the electronic device case.

According to another aspect of the present invention, there is provided a method of manufacturing an antenna pattern frame, the method including: placing an antenna radiator in an inner space of a mold for manufacturing an antenna pattern frame, the antenna radiator including an antenna pattern portion receiving an external signal and a connection terminal portion connected to a circuit board of an electronic device and transmitting to the received external signal to the electronic device, the antenna pattern portion and the connection terminal portion being arranged in different planes; and injecting a resin material in the mold for manufacturing an antenna pattern frame so that a radiator frame having the antenna radiator on a surface thereof is formed in the inner space of the mold for manufacturing an antenna pattern frame, wherein the resin material is injected up to a guide boss forming recess formed in the mold for manufacturing an antenna pattern frame.

The mold for manufacturing an antenna pattern frame may include upper and lower molds, and one of the antenna pattern portion and the connection terminal portion may contact one of the upper and lower molds and the other one of the antenna pattern portion and the connection terminal portion may contact the other one of the upper and lower molds so that a top of the antenna radiator is at the same level as that of the radiator frame.

The guide boss forming recess may have a sectional area decreasing inwardly of the mold for manufacturing an antenna pattern frame.

The guide boss forming recess may be stepped to have a reduced sectional area, such that a tip portion having a relatively small sectional area is formed inside the mold for manufacturing an antenna pattern frame.

According to another aspect of the present invention, there is provided a mold for manufacturing an antenna pattern frame, the mold including: an upper or lower mold receiving an antenna radiator including an antenna pattern portion receiving an external signal and a connection terminal portion transmitting the external signal to an electronic device, the antenna pattern portion and the connection terminal portion being arranged in different planes; a resin material injection portion provided through the upper mold, the lower mold, or the upper and lower molds, the resin material injection portion through which a resin material is injected into an inner space created between the upper and lower molds so that the resin material filling the inner space therebetween forms a radiator frame having the antenna radiator on a surface thereof when the upper and lower molds are joined; and a guide boss forming portion formed in the upper or lower mold, the guide boss forming portion in which a guide boss protruding from the radiator frame is formed while the radiator frame is formed in the inner space.

The guide boss forming portion may be a recess having a sectional area decreasing in a depth direction of the mold for manufacturing an antenna pattern frame.

The guide boss forming recess may be stepped to have a reduced sectional area, such that a tip portion with a relatively small sectional area is formed inside the mold for manufacturing an antenna pattern frame.

According to another aspect of the present invention, there is provided a method of manufacturing an electronic device case, the method including: placing an antenna pattern frame in an inner space of a mold for manufacturing an electronic device case, the antenna pattern frame including an antenna radiator including an antenna pattern portion receiving an external signal and a connection terminal portion transmitting the external signal to an electronic device, the antenna pattern portion and the connection terminal portion being arranged in different planes; placing a guide boss formed on the antenna pattern frame to make contact with or form a fine gap with one inner side of the mold for manufacturing an electronic device case, so that the antenna pattern frame is prevented from moving vertically in the mold for manufacturing an electronic device case; and injecting a resin material in the inner space of the mold for manufacturing an electronic device to form an electronic device case having the antenna pattern portion embedded therein, wherein the resin material is injected at a temperature at which an end portion of the guide boss contacting the mold is melted.

According to another aspect of the present invention, there is provided an electronic device case including: an antenna radiator including an antenna pattern portion receiving an external signal and a connection terminal portion transmitting the external signal to an electronic device, the antenna pattern portion and the connection terminal portion being arranged in different planes; a radiator frame supporting the antenna radiator and including a guide boss protruding from the radiator frame; and an exterior portion covering the radiator frame and having a boundary with the guide boss underneath a surface of the exterior portion.

The guide boss may have a sectional area decreasing toward the exterior portion.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
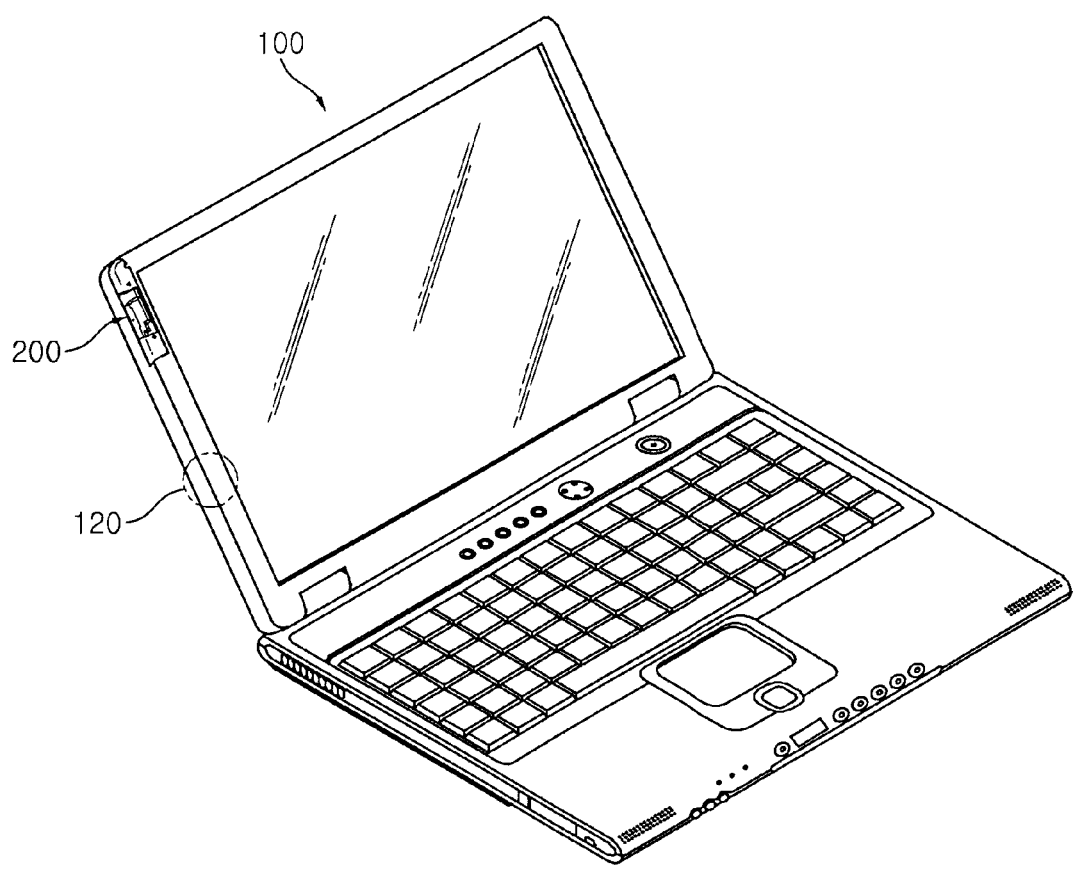
FIG. 1 is a schematic perspective view, with a cut-out portion, of a case of a laptop computer, which is an electronic device having an antenna embedded therein, according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, like reference numerals in the drawings denote like elements.

[Antenna Pattern Frame]

Figure 2:
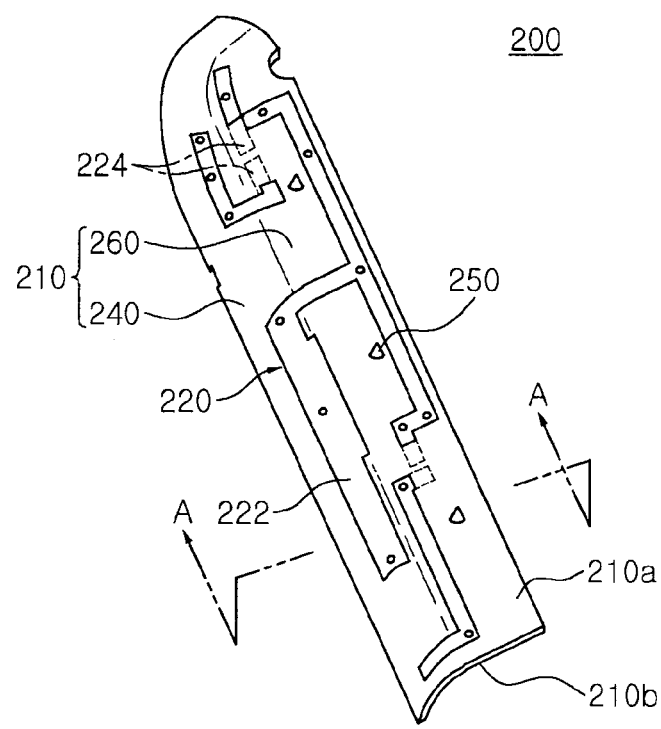
FIG. 2 is a schematic perspective view illustrating an antenna pattern frame according to an exemplary embodiment of the present invention.
Figure 3:
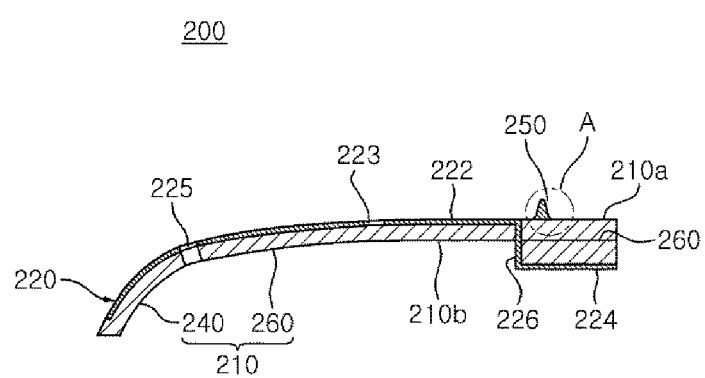
FIG. 3 is a cross-sectional view illustrating the antenna pattern frame depicted in FIG. 2.

FIG. 1 is a schematic perspective view, with a cut-out portion, of a case of a laptop computer, which is an electronic device having an antenna embedded therein, according to an exemplary embodiment of the present invention. FIG. 2 is a schematic perspective view illustrating an antenna pattern frame according to an exemplary embodiment of the present invention. FIG. 3 is a cross-sectional view illustrating the antenna pattern frame depicted in FIG. 2.

Referring to FIGS. 1 through 3, an antenna pattern frame 200 is applied to a case 120 of a laptop computer 100, which is an electronic device. The antenna pattern frame 200 may be applied to every electronic device using an antenna, in addition to the laptop computer 100.

The antenna pattern frame 200 is used in order that an antenna radiator 220 receiving an external signal may be disposed at or in the vicinity of the center of the inner section of the case 120 of the electronic device.

The antenna pattern frame 200, according to this embodiment, includes the antenna radiator 220, an antenna radiator frame 210, and a guide boss 250.

The antenna radiator 220 is formed of a conductive material such as aluminum or copper. Further, the antenna radiator 220 may receive external signals and transmit the received external signals to a signal processor of the electronic device 100. Further, the antenna radiator 220 may include an antenna pattern portion 222, which is a meander line antenna pattern, in order to receive external signals with various bands.

Connection terminal portions 224 transmit the received external signals to the electronic device, and may be formed by bending, forming or drawing a portion of the antenna radiator 220. Alternatively, the connection terminal portions 224 may be manufactured separately from the antenna radiator 220 and then be connected to the antenna radiator 220.

The radiator frame 210 may have a three-dimensional structure consisting of a straight portion 260 having a flat profile and a curved portion 240 with a curvature. The antenna radiator 220 may have flexibility such that the antenna radiator 220 can be disposed along the curved portion 240 of the radiator frame 210.

The radiator frame 210 is produced by injection molding. While the antenna pattern portion 222 may be formed on one side 210a of the radiator frame 210, the connection terminal portions 224 may be formed on the other side 210b opposite to the one side 210a.

The antenna radiator 220, which is embedded in the electronic device case 120, has the antenna pattern portion 222 receiving external signals and the connection terminal portions 224 transmitting the received external signals to the electronic device. Here, the antenna pattern portion 222 and the connection terminal portions 224 may be arranged in the different planes.

The one side 210a of the radiator frame 210, on which the antenna pattern portion 222 is formed, is bonded to the inside of the electronic device case 120, so that an antenna pattern can be embedded in the electronic device case 120.

Alternatively, an antenna pattern may be embedded in the electronic device case 120 by placing the antenna pattern frame 200 in a mold and performing insert molding.

Therefore, the antenna pattern frame 200 serves as a first injection molded part in the process of embedding the antenna radiator 220 including the antenna pattern portion 222 in the electronic device case 120.

The antenna radiator 220 and the radiator frame 210 may have the same boundary, which increases the fluidity of materials, such as resin, during a second injection molding process in which the antenna pattern frame 200 is placed within the mold after the first injection molding process.

The antenna radiator 220 of the antenna pattern frame 200 may be bent to form the connection terminal portions 224, the antenna pattern portion 222, and connection portions 226 connected therebetween.

The connection portions 226 may connect the antenna pattern portion 222 and the connection terminal portions 224 to be arranged in the different planes. The connection terminal portions 224 that are not embedded in the electronic device case may be exposed on the other side 210b of the antenna pattern frame 200.

That is, the radiator 220 is bent on the basis of the connection portions 226 to form the antenna pattern portion 222 and the connection terminal portions 224, so that the antenna radiator 220 can be realized to have a three-dimensionally curved surface.

In order to support the antenna radiator 220 having the three-dimensionally curved surface, radiator support portions 260 may protrude from the other side 210b of the radiator frame 210.

The radiator support portions 260 can firmly support the connection portions 226 and the connection terminal portions 224 that are exposed on the other side 210b.

The guide boss 250 protrudes from the one side 210a of the radiator frame 210. The guide boss 250 prevents the radiator frame 210 from moving vertically in a mold 500 (see FIG. 8) for manufacturing an electronic device case having an inner space having a shape corresponding to that of the electronic device case 120.

In order to prevent the vertical movement of the radiator frame 210 in the mold 500 for manufacturing an electronic device case, the guide boss 250 may contact the mold 500 or have a fine gap therebetween.

Figure 4:
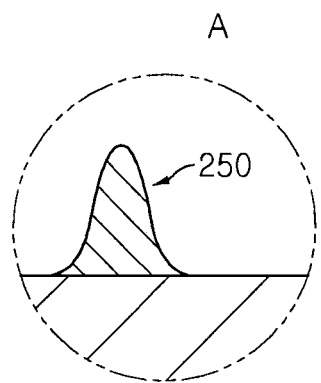
FIG. 4 is a schematic enlarged view illustrating a first embodiment of the part A of FIG. 3.
Figure 5:
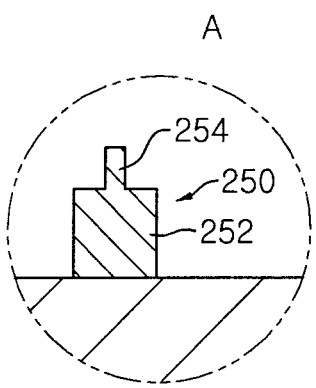
FIG. 5 is a schematic enlarged view illustrating a second embodiment of the part A of FIG. 3.

FIG. 4 is a schematic enlarged view illustrating a first embodiment of the part A of FIG. 3, and FIG. 5 is a schematic enlarged view illustrating a second embodiment of the part A of FIG. 3.

FIGS. 4 and 5 illustrate embodiments of the guide boss 250.

The guide boss 250 of FIG. 4 protrudes from the radiator frame 210 while its sectional area is gradually decreased in the protruding direction thereof.

The guide boss 250 of FIG. 5 has a body portion 252 and a tip portion 254 that are stepped. The tip portion 254 has a smaller sectional area than the body portion 252.

The guide boss 250 may be formed of the same resin material as that of the electronic device case 120 or a material having a lower melting point than the resin material.

The tip portion 254 of the guide boss 250 is melted when injecting a resin material into a mold for injection-molding the electronic device case 120, so that the guide boss 250 becomes unrecognizable from the exterior portion (122, see FIG. 10) of the electronic device case 120. Therefore, consumer emotional attraction regarding the appearance of the exterior portion 122 is improved.

[Method and Mold for Manufacturing Antenna Pattern Frame]

Figure 6:
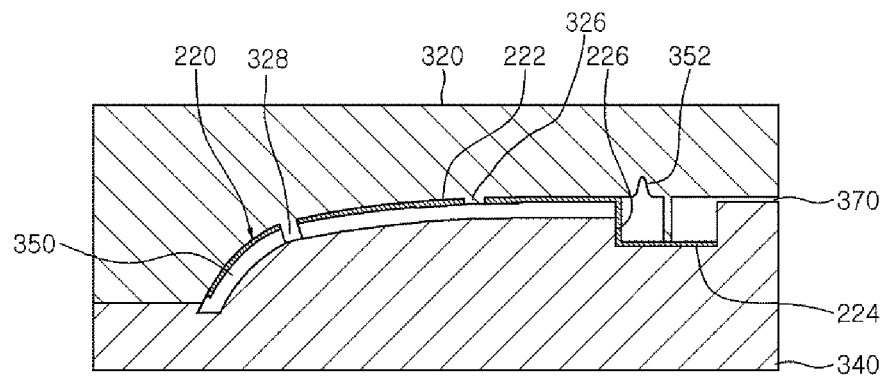
FIG. 6 is a schematic cross-sectional view illustrating a mold for manufacturing an antenna pattern frame in order to illustrate a method of manufacturing an antenna pattern frame according to an exemplary embodiment of the present invention.
Figure 7:
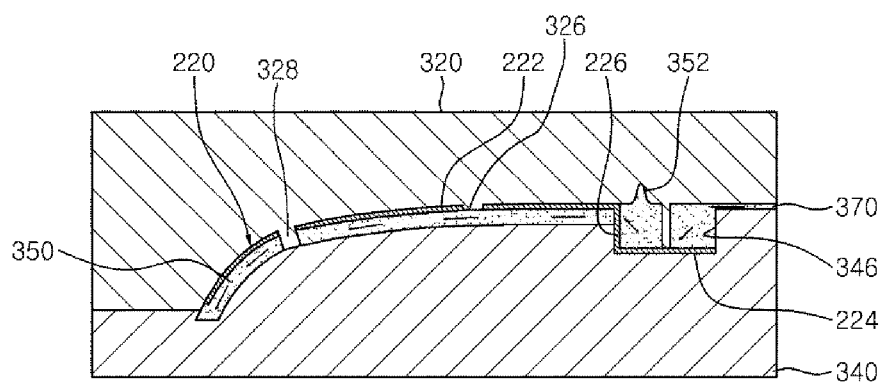
FIG. 7 is a schematic cross-sectional view illustrating how a resin material is injected into the mold of FIG. 6.

FIG. 6 is a schematic cross-sectional view illustrating a mold for manufacturing an antenna pattern frame in order to illustrate a method of manufacturing an antenna pattern frame according to an exemplary embodiment of the present invention. FIG. 7 is a schematic cross-sectional view illustrating how a resin material is injected into the mold of FIG. 6;

Hereinafter, a method of manufacturing the antenna pattern frame 200 according to an exemplary embodiment of the invention will be described with reference to FIGS. 6 and 7.

First, as shown in FIG. 6, the antenna radiator 220 has the antenna pattern portion 222 and the connection terminal portions 224 that are arranged in the different planes. The antenna pattern portion 222 receives external signals. The connection terminal portions 224 are in contact with the circuit board of the electronic device.

The antenna radiator 220 may have a three-dimensional structure. Specifically, the radiator 220 is bent to form the antenna pattern portion 222 and the connection terminal portions 224, and the connection portions 226 connected therebetween.

After the antenna radiator 220 is provided, the antenna radiator 220 is placed in an inner space 350 of the mold 300.

The inner space 350 is created when an upper mold 320 and a lower mold 340 are joined. A recess, formed in the upper mold 320 or the lower mold 340, becomes the inner space 350 when the upper mold 320 and the lower mold 340 are joined.

When the upper mold 320 and the lower mold 340 are joined, guide pins 328, contact pins 326, or the guide pins 328 and the contact pins 326, formed in the upper mold 320 or the lower mold 340, are inserted into or make contact with guide pin holes 225, contact pin holes 223, or the guide pin holes 225 and the contact pin holes 223, formed in the antenna pattern portion 222, so that the antenna radiator 220 can be fixed in the inner space 350.

A resin material is injected into the inner space 350 to form the radiator frame 210, so that the antenna pattern portion 222 is embedded in the electronic device case 120.

Here, the inner space 350 of the upper or lower mold 320 or 340 is curved so that the radiator frame 210 has a curved portion 240.

The resin material is injected so that the top of the radiator 220 is at the same level as that of the radiator frame 210. Therefore, when the radiator frame 210 is put in the mold for injection molding in order to manufacture the electronic device case 120 in which the antenna pattern is embedded, the flowability of the resin can be improved.

The inner space 350 may have a guide boss recess 352 to form the guide boss 250 on the radiator frame 210.

The guide boss recess 352 may be formed by recessing the mold 300 while having a gradually decreasing sectional area. Alternatively, the guide boss recess 352 may be stepped to be decreased inwardly in sectional area, and may have a tip-portion forming recess (not shown) formed inside the mold 300 and having a shape corresponding to that of the tip portion 254. Here, the tip-portion forming recess has a smaller sectional area than the other portion of the guide boss recess 352.

The resin material, when injected, is filled up to the guide boss recess 352 to thereby form the guide boss on the radiator frame 210.

Referring to FIGS. 6 and 7, the mold 300 for manufacturing the antenna pattern frame 200 will be described in detail.

The mold 300 for manufacturing the electronic device case 120 having the antenna pattern portion 222 embedded therein according to an exemplary embodiment of the invention may include the upper and lower molds 320 and 340, the resin material injection portion 370, and a guide boss forming portion.

The antenna radiator 220 may be received between the upper and lower molds 320 and 340 while the antenna pattern portion 222 receiving an external signal and the connection terminal portions 224 in contact with the circuit board 140 of the electronic device are arranged in the different planes.

The resin material injection portion 370 is a passage through which a resin material flows. The resin material injection portion may be formed in the upper mold 320, the lower mold 340 or the upper and lower molds 320 and 340. When the upper and lower molds 320 and 340 are joined, the resin material is injected into the inner space 350 between the upper and lower molds 320 and 340 so that the resin material filling the inner space 350 forms the radiator frame 210 that allows the antenna pattern portion 222 to be placed within the electronic device case 120.

The inner space 350 between the upper and lower molds 320 and 340 may have a space allowing the radiator frame 210 to have the curved portion 240.

The guide boss forming portion may be configured as a recess 352 decreasing in sectional area in a depth direction of the mold 300. The guide boss forming recess 352 may include the tip-portion forming recess (not shown) stepped inside the mold 300 to have a reduced sectional area and having a shape corresponding to that of the tip portion 254 of FIG. 5.

[Electronic Device Case and Method of Manufacturing Electronic Device Case]

Figure 8:
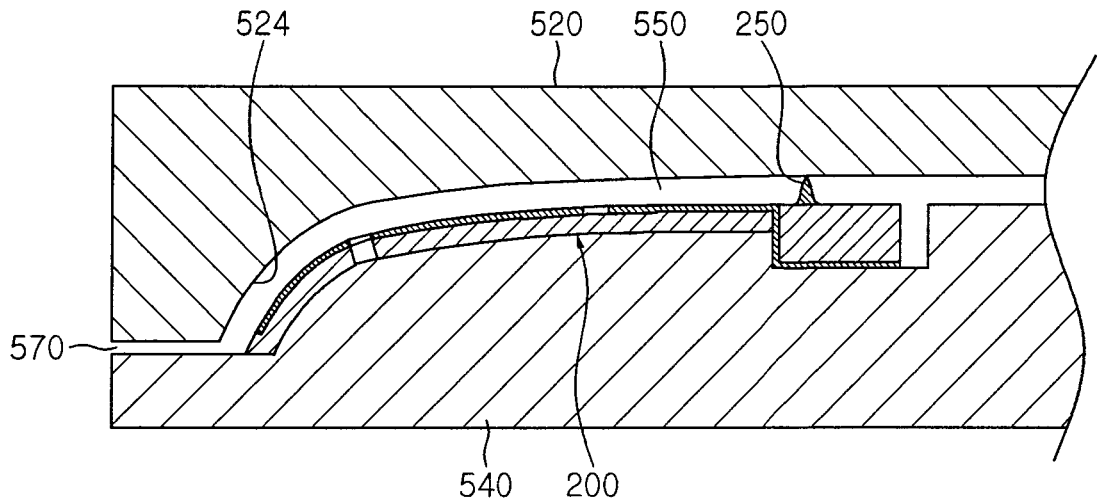
FIG. 8 is a schematic cross-sectional view illustrating a method for manufacturing an electronic device case, which is used to perform a method of manufacturing an electronic device case having an antenna pattern radiator embedded therein, according to an exemplary embodiment of the present invention.
Figure 9:
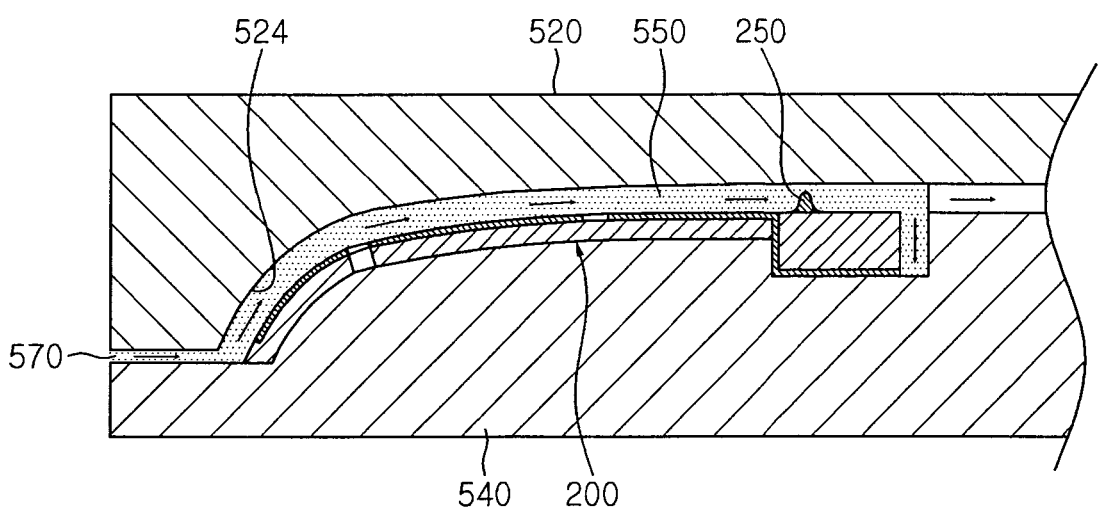
FIG. 9 is a schematic cross-sectional view illustrating how a resin material is injected into the mold of FIG. 8.
Figure 10:
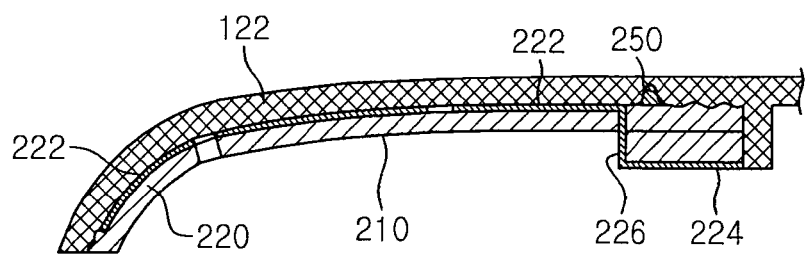
FIG. 10 is a schematic cross-sectional view illustrating a completed electronic device case produced by a process depicted in FIG. 9.

FIG. 8 is a schematic cross-sectional view illustrating a method for manufacturing an electronic device case, which is used to perform a method of manufacturing an electronic device case having an antenna pattern radiator embedded therein, according to an exemplary embodiment of the present invention. FIG. 9 is a schematic cross-sectional view illustrating how a resin material is injected into the mold of FIG. 8. FIG. 10 is a schematic cross-sectional view illustrating a completed electronic device case produced by a process depicted in FIG. 9.

Referring to FIGS. 8 and 9, the electronic device case 120 having the antenna pattern radiator 220 embedded therein is manufactured in such a way that the radiator frame 210 is arranged in the mold 500 for manufacturing an electronic device case that has the inner space 550 having a shape corresponding to the case frame, and the resin material is fed into the inner space 550, thereby forming the radiator frame 210 integrally with the electronic device case 120.

The radiator frame 210 and the electronic device case 120 may be formed integrally with each other. That is, when the resin material is introduced, the molded surface of the radiator frame 210 contacting the resin material is partially melted so that the radiator frame 210 and the electronic device case 120 can be firmly coupled with each other.

Here, injection molding for manufacturing the antenna pattern frame 200 is referred to as a first injection molding process, and injection molding for manufacturing the electronic device case 120 is referred to as a second injection molding process. As in the first injection molding process, the movement of the antenna pattern frame 200 inside the mold 500 needs to be prevented during the second injection molding process.

Here, the guide boss 250 protruding from the antenna pattern frame 200 may contact or have a fine gap with one inner side of the mold 500 for manufacturing an electronic device case. The guide boss 250 prevents the vertical movement of the antenna pattern frame 200 in the mold 500 for an electronic device case.

Furthermore, the inner space 550 of the mold 500 may include a curve generation portion 524 that allows the electronic device case 120 to be curved.

As the resin material is fed into the mold 500, the upper end of the guide boss 250 is melted so that the antenna pattern frame 200 is unrecognizable from an exterior portion 122 of the case 120.

The mold of the electronic device case for manufacturing the electronic device case 120 having the antenna pattern embedded therein during the second injection molding process may include upper or lower mold 520 or 540 and a resin material injection portion 570. The upper or lower mold 520 and 540 receives the radiator frame 210 including the antenna radiator 220 having the antenna pattern portion 222 receiving an external signal and the connection terminal portions 224 making contact with the circuit board of the electronic device while the antenna pattern portion 222 and the connection terminal portions 224 are formed in the different planes. The resin material injection portion 570 is formed in the upper mold 520, the lower mold 540, or the upper and lower molds 520 and 540. A resin material flows through the resin material injection portion 570 into the inner space 550 created when the upper and lower molds 520 and 540 are joined, so that the resin material filling the inner space 550 forms the electronic device case 120.

The electronic device case 120 produced by the above method and mold for manufacturing an electronic device case may include the antenna radiator 220 including the antenna pattern portion 222 receiving an external signal and the connection terminal portions 224 making contact with the circuit board of the electronic device and transmitting the external signal to the electronic device while the antenna pattern portion 222 and the connection terminal portions 224 are formed in the different planes, the radiator frame 210 supporting the antenna radiator 220 and having the guide boss 250 protruding therefrom, and the exterior portion 122 covering the radiator frame 210 having a boundary with the guide boss 25 underneath a surface of the exterior portion 122.

The guide boss 250 may have a sectional area reducing toward the exterior portion 122 as its end portion is melted due to the inflow of the resin material during the second injection molding process.

As set forth above, according to an antenna pattern frame, a method for manufacturing the same, and a method of manufacturing an electronic device case according to the exemplary embodiments of the invention, an antenna pattern frame is prevented from moving vertically in a mold for manufacturing an electronic device case, so that an antenna radiator can be embedded stably in the electronic device case.

Furthermore, since the antenna radiator is embedded stably in the electronic device case, detective antenna performance can be reduced.

In addition, a resin material, being injected into the mold for manufacturing an electronic device case, melts an end portion of a guide boss preventing the vertical movement of the antenna pattern frame in the mold of the electronic device case, so that the boundary of the guide boss is unrecognizable from the appearance of the injection-molded electronic device case.

While the present invention has been shown and described in connection with the exemplary embodiments, it will be apparent to those skilled in the art that modifications and variations can be made without departing from the spirit and scope of the invention as defined by the appended claims.

What is claimed is:

1. An antenna pattern frame, comprising:
  an antenna radiator receiving an external signal and transmitting the received external signal to an electronic device;
  a radiator frame having the antenna radiator on a surface thereof; and
  a guide boss protruding from the radiator frame and preventing the radiator frame from moving vertically in a mold for manufacturing an electronic device case having an inner space having a shape corresponding to that of the electronic device case.

2. The antenna pattern frame of claim 1, wherein the guide boss makes contact with the mold for manufacturing the electronic device case, or forms a fine gap with the mold for manufacturing the electronic device case.

3. The antenna pattern frame of claim 1, wherein the antenna radiator comprises:
  an antenna pattern portion controlling a reception bandwidth of an external signal; and
  a connection terminal portion transmitting the received external signal to an electronic device,
  wherein the antenna pattern portion and the connection terminal portion are arranged in different planes of the radiator frame.

4. The antenna pattern frame of claim 3, wherein the antenna radiator is bent to provide the connection terminal portion, the antenna pattern portion, and a connection portion connected therebetween.

5. The antenna pattern frame of claim 1, wherein the radiator frame has a curved portion with a curvature, and the antenna radiator is flexible so that the antenna radiator is disposed on the curved portion.

6. The antenna pattern frame of claim 1, wherein the antenna radiator has a top at the same level as that of the radiator frame.

7. The antenna pattern frame of claim 1, wherein the guide boss protrudes from the radiator frame while having a decreasing sectional area.

8. The antenna pattern frame of claim 1, wherein the guide boss has a body portion and a tip portion having a smaller area than the body portion.

9. The antenna pattern frame of claim 1, wherein the guide boss is formed of the same material as a resin material forming the electronic device case.

10. The antenna pattern frame of claim 1, wherein the guide boss is formed of a material having a lower melting point than a resin material forming the electronic device case.

11. A method of manufacturing an antenna pattern frame, the method comprising:
  placing an antenna radiator in an inner space of a mold for manufacturing an antenna pattern frame, the antenna radiator including an antenna pattern portion receiving an external signal and a connection terminal portion connected to a circuit board of an electronic device and transmitting to the received external signal to the electronic device, the antenna pattern portion and the connection terminal portion being arranged in different planes; and
  injecting a resin material in the mold for manufacturing an antenna pattern frame so that a radiator frame having the antenna radiator on a surface thereof is formed in the inner space of the mold for manufacturing an antenna pattern frame, wherein the resin material is injected up to a guide boss forming recess formed in the mold for manufacturing an antenna pattern frame.

12. The method of claim 11, wherein the mold for manufacturing an antenna pattern frame includes upper and lower molds, and one of the antenna pattern portion and the connection terminal portion contacts one of the upper and lower molds and the other one of the antenna pattern portion and the connection terminal portion contacts the other one of the upper and lower molds so that a top of the antenna radiator is at the same level as that of the radiator frame.

13. The method of claim 11, wherein the guide boss forming recess has a sectional area decreasing inwardly of the mold for manufacturing an antenna pattern frame.

14. The method of claim 11, wherein the guide boss forming recess is stepped to have a reduced sectional area, such that a tip portion having a relatively small sectional area is formed inside the mold for manufacturing an antenna pattern frame.

15. A mold for manufacturing an antenna pattern frame, the mold comprising:
  an upper or lower mold receiving an antenna radiator including an antenna pattern portion receiving an external signal and a connection terminal portion transmitting the external signal to an electronic device, the antenna pattern portion and the connection terminal portion being arranged in different planes;

a resin material injection portion provided through the upper mold, the lower mold, or the upper and lower molds, the resin material injection portion through which a resin material is injected into an inner space created between the upper and lower molds so that the resin material filling the inner space therebetween forms a radiator frame having the antenna radiator on a surface thereof when the upper and lower molds are joined; and a guide boss forming portion formed in the upper or lower mold, the guide boss forming portion in which a guide boss protruding from the radiator frame is formed while the radiator frame is formed in the inner space.

16. The mold of claim 15, wherein the guide boss forming portion is a recess having a sectional area decreasing in a depth direction of the mold for manufacturing an antenna pattern frame.

17. The mold of claim 15, wherein the guide boss forming recess is stepped to have a reduced sectional area such that a tip portion having a relatively small sectional area is formed inside the mold for manufacturing an antenna pattern frame.

18. A method of manufacturing an electronic device case, the method comprising:

placing an antenna pattern frame in an inner space of a mold for manufacturing the electronic device case, the antenna pattern frame including an antenna radiator including an antenna pattern portion receiving an external signal and a connection terminal portion transmitting the external signal to an electronic device, the antenna pattern portion and the connection terminal portion being arranged in different planes;

placing a guide boss formed on the antenna pattern frame to make contact with or form a fine gap with one inner side of the mold for manufacturing the electronic device case, so that the antenna pattern frame is prevented from moving vertically in the mold for manufacturing the electronic device case; and injecting a resin material in the inner space of the mold for manufacturing the electronic device to form the electronic device case having the antenna pattern portion embedded therein, wherein the resin material is injected at a temperature at which an end portion of the guide boss contacting the mold is melted.

19. An electronic device case, comprising:

an antenna radiator including an antenna pattern portion receiving an external signal and a connection terminal portion transmitting the external signal to an electronic device, the antenna pattern portion and the connection terminal portion being arranged in different planes;

a radiator frame supporting the antenna radiator and including a guide boss protruding from the radiator frame; and an exterior portion covering the radiator frame and having a boundary with the guide boss underneath a surface of the exterior portion.

20. The electronic device case of claim 19, wherein the guide boss has a sectional area decreasing toward the exterior portion.

* * * * *